United States Patent
Mandlekar et al.

(10) Patent No.: US 12,226,913 B2
(45) Date of Patent: Feb. 18, 2025

(54) METHODS AND SYSTEMS TO REMOTELY OPERATE ROBOTIC DEVICES

(71) Applicant: The Board of Trustees of the Leland Stanford Junior University, Stanford, CA (US)

(72) Inventors: Ajay U. Mandlekar, Stanford, CA (US); Yuke Zhu, Stanford, CA (US); Animesh Garg, Stanford, CA (US); Silvio Savarese, Stanford, CA (US); Fei-Fei Li, Stanford, CA (US)

(73) Assignee: The Board of Trustees of the Leland Stanford Junior University, Stanford, CA (US)

(*) Notice: Subject to any disclaimer, the term of this patent is extended or adjusted under 35 U.S.C. 154(b) by 348 days.

(21) Appl. No.: 17/755,587

(22) PCT Filed: Nov. 2, 2020

(86) PCT No.: PCT/US2020/058542
§ 371 (c)(1),
(2) Date: May 2, 2022

(87) PCT Pub. No.: WO2021/087455
PCT Pub. Date: May 6, 2021

(65) Prior Publication Data
US 2023/0226696 A1 Jul. 20, 2023

Related U.S. Application Data

(60) Provisional application No. 62/929,663, filed on Nov. 1, 2019.

(51) Int. Cl.
*G06F 17/00* (2019.01)
*B25J 9/16* (2006.01)
*B25J 13/00* (2006.01)

(52) U.S. Cl.
CPC .......... *B25J 9/1689* (2013.01); *B25J 9/1682* (2013.01); *B25J 13/006* (2013.01)

(58) Field of Classification Search
CPC ...... B25J 9/1689; B25J 9/1682; B25J 13/006; B25J 9/0084
(Continued)

(56) References Cited

U.S. PATENT DOCUMENTS 7,720,572 B2 * 5/2010 Ziegler .................. G05D 1/021
713/153
8,265,793 B2 9/2012 Cross et al.
(Continued)

FOREIGN PATENT DOCUMENTS

KR 101751297 B1 6/2017
WO 2021087455 A1 5/2021

OTHER PUBLICATIONS

Robot Network 13.05 User Guide (Year: 2023).*
(Continued)

*Primary Examiner* — Ronnie M Mancho
(74) *Attorney, Agent, or Firm* — KPPB LLP

(57) ABSTRACT

Methods and systems to remotely operate robotic devices are provided. A number of embodiments allow users to remotely operate robotic devices using generalized consumer devices (e.g., cell phones). Additional embodiments provide for a platform to allow communication between consumer devices and the robotic devices. Further embodiments allow for training robotic devices to operate autonomously by training the robotic device with machine learning algorithms using data collected from scalable methods of controlling robotic devices.

19 Claims, 10 Drawing Sheets
(9 of 10 Drawing Sheet(s) Filed in Color)

(58) Field of Classification Search
USPC .......................................................... 700/264
See application file for complete search history.

(56) References Cited

U.S. PATENT DOCUMENTS

| | | | |
|---|---|---|---|
| 8,588,976 | B2 | 11/2013 | Mangaser et al. |
| 8,793,205 | B1 | 7/2014 | Fisher et al. |
| 9,403,273 | B2 | 8/2016 | Payton et al. |
| 9,457,468 | B1 | 10/2016 | Elazary et al. |
| 9,592,604 | B2 | 3/2017 | Hoffman et al. |
| 9,744,669 | B2* | 8/2017 | Wicks ................... G06V 20/10 |
| 10,061,896 | B2 | 8/2018 | Jordan et al. |
| 10,079,012 | B2* | 9/2018 | Klimanis .............. G10L 15/065 |
| 11,878,422 | B2* | 1/2024 | Oyekanlu ........ G05B 19/41895 |
| 2009/0177323 | A1* | 7/2009 | Ziegler ................ G05D 1/0246 901/1 |
| 2018/0157973 | A1 | 6/2018 | El-yaniv et al. |
| 2019/0249394 | A1* | 8/2019 | Mehra ..................... E02F 9/261 |
| 2022/0371192 | A1* | 11/2022 | Oyekanlu ................ B25J 9/161 |

OTHER PUBLICATIONS

International Preliminary Report on Patentability for International Application No. PCT/US2020/058542, Report issued May 3, 2022, Mailed May 12, 2022, 6 Pgs.
International Search Report and Written Opinion for International Application No. PCT/US2020/058542, Search completed Feb. 21, 2021, Mailed Mar. 18, 2021, 13 Pgs.
Abbeel et al., "Autonomous Helicopter Aerobatics through Apprenticeship Learning", The International Journal of Robotics Research, Jun. 23, 2010, vol. 29, No. 13, pp. 1608-1639, https://doi.org/10.1177/0278364910371999.
Argall et al., "A survey of robot learning from demonstration", Robotics and Autonomous Systems, May 31, 2009, vol. 57, Issue 5, pp. 469-483, https://doi.org/10.1016/j.robot.2008.10.024.
Aytar et al., "Playing Hard Exploration Games by Watching Youtube", Advances in Neural Information Processing Systems, 2018, pp. 2935-2945.
Boularias et al., "Relative entropy inverse reinforcement learning", in Proceedings of the 14th Int'l Conference on Artificial Intelligence and Statistics (AISTATS), 2011, pp. 182-189.
Danielczuk et al., "Mechanical Search: Multi-Step Retrieval of a Target Object Occluded by Clutter ", arXiv:1903.01588v1 [cs.RO], Mar. 4, 2019, 9 pgs.
Deng et al., "ImageNet: A Large-Scale Hierarchical Image Database", IEEE Computer Vision and Pattern Recognition, 2009, 8 pgs.
Forbes et al., "Robot Programming by Demonstration with Crowdsourced Action Fixes", Second AAAI Conference on Human Computation and Crowdsourcing, 2014, 10 pgs.
Fritsche et al., "First-Person Teleoperation of a Humanoid Robot", IEEE—RAS 15th Int'l Conference on Humanoid Robots (Humanoids), 2015, 6 pgs.
Goldberg, "Beyond the Web: Excavating the Real World via Mosaic", in Second International WWW Conference, Chicago, Illinois, Oct. 17-21, 1994, 12 pgs.
Goldfeder et al., "The Columbia Grasp Database", IEEE International Conference on Robotics and Automation, 2009, pp. 1710-1716.
Hart et al., "Development of NASA-TLX (Task Load Index): Results of Empirical and Theoretical Research", Advances in Psychology, vol. 52, Elsevier, 1988, pp. 139-183.
James et al., "Sim-to-Real via Sim-to-Sim: Data-efficient Robotic Grasping via Randomized-to-Canonical Adaptation Networks", Proceedings of the IEEE Conference on Computer Vision and Pattern Recognition, 2019, pp. 12627-12637.
Kalashnikov et al., "QT-Opt: Scalable Deep Reinforcement Learning for Vision-Based Robotic Manipulation", arXiv:1806.10293v3 [cs.LG], Nov. 28, 2018, 23 pgs.
Kasper et al., "The KIT object models database: An object model database for object recognition, localization and manipulation in service robotics", The International Journal of Robotics Research, 2012, vol. 31, No. 8, pp. 927-934, DOI:10.1177/0278364912445831.
Kehoe et al., "A Survey of Research on Cloud Robotics and Automation", IEEE Transactions on Automation Science and Engineering, 2015, vol. 12, No. 2, pp. 1-11.
Kent et al., "A Comparison of Remote Robot Teleoperation Interfaces for General Object Manipulation", Proceedings of the 2017 ACM/IEEE International Conference on Human-Robot Interaction, ACM, 2017, pp. 371-379, https://doi.org/10.1145/2909824.3020249.
Kofman et al., "Teleoperation of a Robot Manipulator Using a Vision-Based Human-Robot Interface", IEEE transactions on Industrial Electronics, Oct. 2005, vol. 52, Issue 5, pp. 1206-1219, first published Sep. 26, 2005, DOI:10.1109/TIE.2005.855696.
Krishnan et al., "SWIRL: A Sequential Windowed Inverse Reinforcement Learning Algorithm for Robot Tasks With Delayed Rewards", The International Journal of Robotics Research, 2019, 16 pgs.
Kurzweil, "Tracking the Acceleration of Intelligence, Stories on Progress", printed Aug. 23, 2021 from http://www.kurzweilai.net/crowdsourcing-for-robots, published Jun. 30, 2014, 4 pgs.
Levine et al., "Learning Hand-Eye Coordination for Robotic Grasping with Deep Learning and Large-Scale Data Collection", arXiv:1603.02199v4 [cs.LG], Aug. 28, 2016, 12 pgs.
Lipton et al., "Baxter's Homunculus: Virtual Reality Spaces for Teleoperation in Manufacturing", arXiv:1703.01270v1 [cs.RO], Mar. 3, 2017, 8 pgs.
Mahler et al., "Dex-Net 2.0: Deep Learning to Plan Robust Grasps with Synthetic Point Clouds and Analytic Grasp Metrics", arXiv:1703.09312v3, Aug. 8, 2017, 12 pgs.
Mandlekar et al., "RoboTurk: A Crowdsourcing Platform for Robotic Skill Learning through Imitation", arXiv:1811.02790v1 [cs.RO], Nov. 7, 2018, 15 pgs.
Marin et al., "A Multimodal Interface to Control a Robot Arm via the Web: A Case Study on Remote Programming", IEEE Transactions on Industrial Electronics, Dec. 5, 2005, vol. 52, Issue 6, pp. 1506-1520, DOI:10.1109/TIE.2005.858733.
Ng et al., "Algorithms for Inverse Reinforcement Learning", Icml, 2000, pp. 663-670.
Penaloza et al., "Robot Reinforcement Learning using Crowdsourced Rewards", Sep. 23, 2013, Retrieved from: http://roboearth.ethz.ch/wp-content/uploads/2013/03/final-7.pdf, 6 pgs.
Pinto et al., "Supersizing Self-supervision: Learning to Grasp from 50K Tries and 700 Robot Hours", arXiv:1509.06825v1 [cs.LG], Sep. 23, 2015, 8 pgs.
Pomerleau, "ALVINN: An autonomous land vehicle in a neural network", Advances in Neural Information Processing Systems, Jan. 1989, pp. 305-313.
Rajpurkar et al., "Know What You Don't Know: Unanswerable Questions for SQUAD", arXiv:1806.03822v1 [cs.CL], Jun. 11, 2018, 9 pgs.
Ross et al., "Learning Monocular Reactive UAV Control in Cluttered Natural Environments", arXiv, Robotics and Automation (ICRA), 2013 IEEE International Conference on, IEEE, Nov. 2012, 8 pgs.
Schulman et al., "Learning from Demonstrations Through the Use of Non-Rigid Registration", Robotics Research, Springer, 2016, pp. 339-354.
Sermanet et al., "Time-Contrastive Networks: Self-Supervised Learning from Video", arXiv:1704.06888v3 [cs.CV], Mar. 20, 2018, 15 pgs.
Sharma et al., "Multiple Interactions Made Easy (MIME): Large Scale Demonstrations Data for Imitation", arXiv:1810.07121v1 [cs.RO], Oct. 16, 2018, 10 pgs.
Sorokin et al., "People Helping Robots Helping People: Crowdsourcing for Grasping Novel Objects", retrieved from http://citeseerx.ist.psu.edu/viewdoc/download?doi=10.1.1.187.5042&rep=rep1&type=pdf, Nov. 19, 2018, 6 pgs.
Sung et al., "Robobarista: Object Part based Transfer of Manipulation Trajectories from Crowd-Sourcing in 3D Pointclouds", Robotics Research, Springer, 2018, 6 pgs.
Toris et al., "The Robot Management System: A Framework for Conducting Human-Robot Interaction Studies Through Crowdsourc-

(56) References Cited

OTHER PUBLICATIONS ing", Journal of Human-Robot Interaction, 2014, vol. 3, No. 2, pp. 25-49, DOI 10.5898/JHRI.3.2.Toris.

Vecerik et al., "Leveraging Demonstrations for Deep Reinforcement Learning on Robotics Problems with Sparse Rewards", arXiv:1707.08817v1 [cs.AI], Jul. 27, 2017, 10 pgs.

Whitney et al., "Comparing Robot Grasping Teleoperation across Desktop and Virtual Reality With ROS Reality", Robotics Research, The 18th International Symposium ISRR, Nov. 2019, pp. 335-350, DOI:10.1007/978-3-030-28619-4_28.

Yan et al., "Learning grasping interaction with geometry-aware 3D representations", arXiv:1708.07303v1 [cs.RO], Aug. 24, 2017, 10 pgs.

Yu et al., "More than a Million Ways to be Pushed. A High-Fidelity Experimental Dataset of Planar Pushing", arXiv:1604.04038v2 [cs.RO], Aug. 4, 2016, 8 pgs.

Zhang et al., "Deep Imitation Learning for Complex Manipulation Tasks from Virtual Reality Teleoperation", arXiv:1710.04615v2 [cs.LG], Mar. 6, 2018, 9 pgs.

\* cited by examiner

METHODS AND SYSTEMS TO REMOTELY OPERATE ROBOTIC DEVICES

CROSS REFERENCE TO RELATED APPLICATIONS

This application claims priority to U.S. Provisional Application Ser. No. 62/929,663, entitled "Methods and Systems to Remotely Operate Robotic Devices," filed Nov. 1, 2019, which is incorporated herein by reference in its entirety.

This application is a national stage of PCT Patent Application No. PCT/US2020/058542, entitled "Methods and Systems to Remotely Operate Robotic Devices," filed Nov. 2, 2020, which claims priority to U.S. Provisional Application Ser. No. 62/929,663, entitled "Methods and Systems to Remotely Operate Robotic Devices," filed Nov. 1, 2019, which are incorporated herein by reference in their entireties.

FIELD OF THE INVENTION

The present invention is directed to systems and methods to remotely operate robotic devices. In particular, systems and methods disclosed herein are directed to scalable ways of controlling robotic devices, including robotic arms, using generalized consumer devices.

BACKGROUND OF THE INVENTION

Today, there are many mechanisms that enable humans to teleoperate robot arms and guide them through performing different kinds of tasks. However, none of these mechanisms allow for remote, inexperienced operators to specify the full motion of the arm in real-time through crowdsourcing. Crowdsourcing robot teleoperation is promising for several applications that require the presence of an on-demand human workforce.

Large, richly annotated datasets have accelerated progress in fields such as computer vision and natural language processing, but replicating these successes in robotics has been challenging. While prior data collection methodologies such as self-supervision have resulted in large datasets, the data can have poor signal-to-noise ratio. By contrast, previous efforts to collect task demonstrations with humans provide better quality data, but they cannot reach the same data magnitude. Furthermore, neither approach places guaranties on the diversity of the data collected, in terms of solution strategies.

Crowdsourcing mechanisms such as Amazon Mechanical Turk have facilitated the creation of large, richly annotated datasets. The advent of datasets, sizing in millions, has accelerated progress in computer vision and natural language processing by enabling the development and evaluation of a wide range of learning algorithms and benchmarks. (See e.g., P. Rajpurkar, et al., "Know What You Don't Know: Unanswerable Questions for SQuAD", arXiv preprint arXiv:1806.03822, 2018; and J. Deng, et al., "Imagenet: A large-scale hierarchical image database", in IEEE Conference on Computer Vision and Pattern Recognition, 2009; the disclosures of which are herein incorporated by reference in their entireties.) Efforts to aggregate similar amounts of data promise to boost performance in the field of robot manipulation.

Subsequently, the community leveraged online self-supervised data collection and off-policy reinforcement learning to collect large quantities of physical robot data for tasks such as grasping (over 1000 hours). (See e.g., D. Kalashnikov, et al., "Qt-opt: Scalable deep reinforcement learning for vision-based robotic manipulation", arXiv preprint arXiv:1806.10293, 2018; L. Pinto and A. Gupta, "Supersizing self-supervision: Learning to grasp from 50k tries and 700 robot hours", in Robotics and Automation (ICRA), 2016 IEEE Intl Conference on, IEEE, 2016; and S. Levine, et al., "Learning hand-eye coordination for robotic grasping with large-scale data collection", in ISER, 2016, pp. 173-184; the disclosures of which are herein incorporated by reference in their entireties.) However, the data collected through such methods often has low signal-to-noise ratio, since a large portion of the data is collected by applying random controls. Subsequently, the time it takes to start collecting high quality data can be prohibitively large, limiting the complexity of the tasks achievable with this approach. Furthermore, specification and evaluation of a reward function for complex tasks can be non-intuitive. In contrast, human demonstrations obviate the need for this specification by implicitly providing a set of successful task executions.

Prior work has shown that imitation learning on data collected from humans can achieve success on a set of restricted task instances. (See e.g., S. Krishnan, et al., "Swirl: A sequential windowed inverse reinforcement learning algorithm for robot tasks with delayed rewards", The International Journal of Robotics Research, 2019; T. Zhang, et al., "Deep imitation learning for complex manipulation tasks from virtual reality teleoperation", arXiv preprint arXiv:1710.04615, 2017; M. Večerík, et al., "Leveraging demonstrations for deep reinforcement learning on robotics problems with sparse rewards", arXiv preprint arXiv:1707.08817, 2017; M. Forbes, et al., "Robot programming by demonstration with crowdsourced action fixes", in Second AAAI Conference on Human Computation and Crowdsourcing, 2014; S. Ross, et al., "Learning monocular reactive uav control in cluttered natural environments", in Robotics and Automation (ICRA), 2013 IEEE International Conference on, IEEE, 2013, pp. 1765-1772; A. Boularias, et al., "Relative entropy inverse reinforcement learning", in Proceedings of the 14th Intl Conference on Artificial Intelligence and Statistics (AISTATS), 2011; P. Abbeel, et al., "Autonomous helicopter aerobatics through apprenticeship learning", The International Journal of Robotics Research, vol. 29, no. 13, pp. 1608-1639, 2010; B. D. Argall, et al., "A survey of robot learning from demonstration", Robotics and autonomous systems, vol. 57, no. 5, pp. 469-483, 2009; and D. A. Pomerleau, "Alvinn: An autonomous land vehicle in a neural network", in Advances in neural information processing systems, 1989, pp. 305-313; the disclosures of which are herein incorporated by reference in their entireties.) However, these approaches have been limited in both the scale of data collected and the complexity of the tasks used for data collection. The ideal approach would be able to collect data on the scale of self-supervised methods but with the quality of human-in-the-loop approaches.

However, replicating the success and impact that large-scale datasets have had in vision and language for robotics has been challenging. The core problem is that the expert needs to demonstrate how to perform a task in real-time, instead of offline data-labeling. Therefore, methods for real-time remote interaction that are robust to delays in both actuation and network latency must be established. More importantly these methods must operate at scale to facilitate crowdsourcing.

SUMMARY OF THE INVENTION

Methods and systems for remotely operating robotic devices are disclosed.

In one embodiment, a system for remotely operating a robotic device includes a network-connected robotic device configured to accomplish a task, a coordination server configured to connect a user to the robotic device, and a data collection server configured to collect data to complete the task form a plurality of users.

In a further embodiment, the system comprises a plurality of network-connected robotic devices configured to accomplish a task, and the coordination server is configured to connect a user to each of the robotic devices in the plurality of robotic devices.

In another embodiment, the coordination server places a lock on the control of each physical robot arm so that only one user may operate a robotic device at a time.

In a still further embodiment, the system further includes a teleoperation server connected to the robotic device, where the coordination server connects the user to the teleoperation server to control the robotic device.

In still another embodiment, the teleoperation server implements a low-pass filter to reject high-frequency user input from the user.

In a yet further embodiment, the system further includes a networked control device to allow the user to control the robotic device.

In yet another embodiment, the control device is a smartphone.

In a further embodiment again, a method for training robots for independent operation includes obtaining a network-connected robotic device, connecting a user to the network-connected robotic device, where the user has control over the network-connected robotic device, training a policy based on the solution developed by the user, and deploying the policy on the network-connected robotic device allowing the network-connected robotic device to operate independently of a human operator.

In another embodiment again, the method further includes collecting data about movement of the network-connected robotic device based on the user control of the device.

In a further additional embodiment, the collecting data step is accomplished by specifying a task for the user to complete using the network-connected robotic device, and solutions completed by the user are saved as data.

In another additional embodiment, the task requires fine-grained dexterity and high-level planning.

In a still yet further embodiment, the obtaining a network-connected robotic device step obtains at least two network-connected robotic devices.

In still yet another embodiment, the connecting a user step connects at least two users.

In a still further embodiment again, the connecting a user step is accomplished using a coordination server.

In still another embodiment again, the coordination server implements a mutual exclusion principle to limit the number of users on a platform.

In a still further additional embodiment, the coordination server connects one user to each network connected robotic device in the at least two network connected robotic devices.

In still another additional embodiment, the network-connected robotic device is connected to a teleoperation server allowing control of the network-connected robotic device by the user over a network.

In a yet further embodiment again, the teleoperation sever includes a low-pass filter to reject high-frequency input from the user.

In yet another embodiment again, the user .controls the network-connected robotic device via a generalized consumer device.

In a yet further additional embodiment, the generalized consumer device is a smartphone.

BRIEF DESCRIPTION OF THE DRAWINGS

This patent or application file contains at least one drawing executed in color. Copies of this patent or patent application publication with color drawing(s) including payment of the necessary fees will be provided to the Office upon request.

These and other features and advantages of the present invention will be better understood by reference to the following detailed description when considered in conjunction with the accompanying drawings where.

DETAILED DISCLOSURE OF THE INVENTION

Figure 1A:
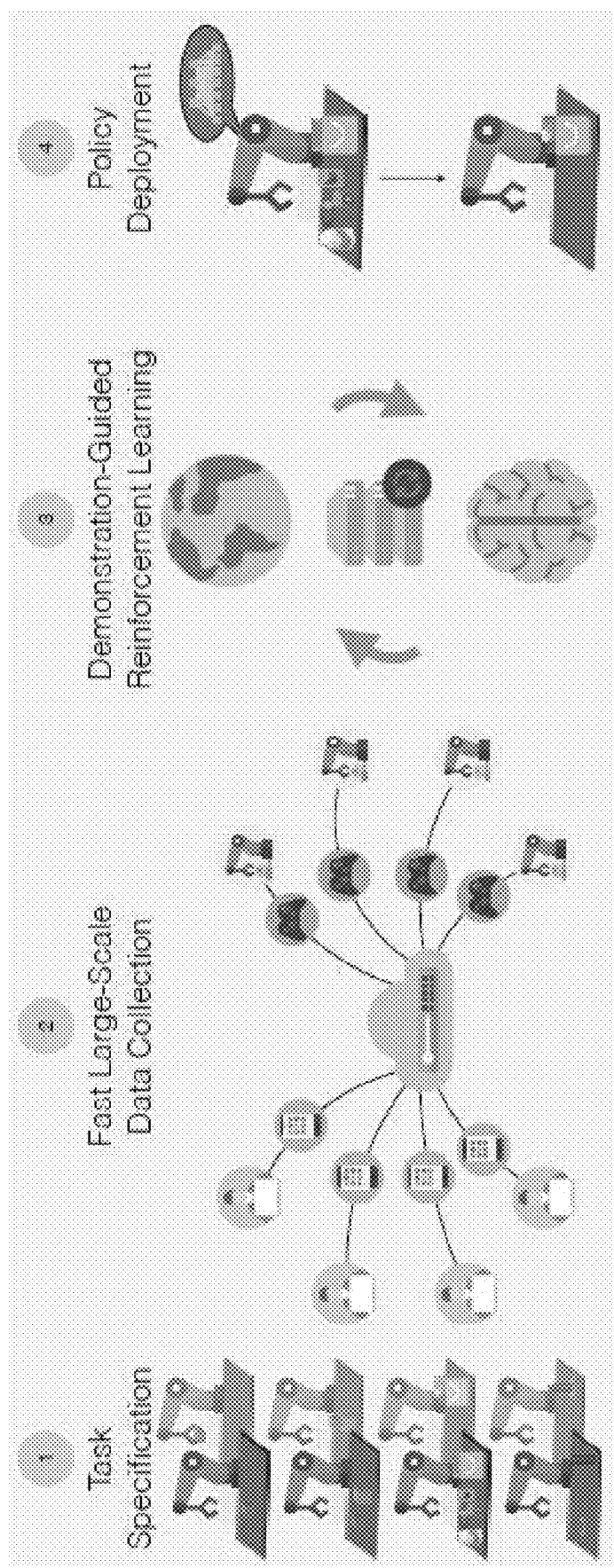
FIG. 1A illustrates a method for crowdsourcing policy training in accordance with various embodiments of the invention.

The embodiments of the invention described herein are not intended to be exhaustive or to limit the invention to precise forms disclosed. Rather, the embodiments selected for description have been chosen to enable one skilled in the art to practice the invention.

Turning to the data and drawings, a systems and methods are provided in which generalized consumer devices are used to remotely operate (or teleoperate) robotic devices, such as robotic arms, thus allowing scalability of robotic control. In many embodiments, the consumer devices include commonly available devices, such as cellular phones, tablet devices, and personal computers, which are nearly ubiquitous in modern culture or society. Many generalized consumer devices are also mobile devices (e.g., mobile phones), which possess sensors, displays, cameras, and other input or output components. In a number of embodiments, the generalized consumer device can be used as a motion interface for remotely controlling robotic devices. Motion interfaces in many embodiments allow for full, free-space positioning control of robotic devices in real time. Certain embodiments provide for a platform to allow communication between consumer devices and the robotic devices, and additional embodiments are directed to using and training automated robotic devices, where the training data arises from scalable and/or sourceable training sets.

Large-Scale Data collection in Robotics. Data-driven methods for learning in robotics have been used to collect grasps and object models, and run large scale physical trials for grasping and pushing. (See e.g., D. Kalashnikov, et al., 2016 (cited above); L. Pinto and A. Gupta, 2016 (cited above); K.-T. Yu, et al., "More than a million ways to be pushed. a high-fidelity experimental dataset of planar pushing", in Intl Conference on Intelligent Robots and Systems, 2016; S. Levine, et al., "Learning hand-eye coordination for robotic grasping with large-scale data collection", in ISER, 2016, pp. 173-184; A. Kasper, et al., "The kit object models database: An object model database for object recognition, localization and manipulation in service robotics", The International Journal of Robotics Research, vol. 31, no. 8, pp. 927-934, 2012; and C. Goldfeder, et al., "The Columbia grasp database", in Robotics and Automation, 2009. ICRA'09. IEEE International Conference on, IEEE, 2009, pp. 1710-1716; the disclosures of which are herein incorporated by reference in their entireties.) These methods used hundreds of hours of robot interaction, although a majority of the trials were not successful.

Simulated and Self-supervised Methods. Large scale self-supervision has low signal-to-noise ratio due to exploration via a random policy. While simulators can scale easily and provide many task variations, several task types, such as those shown in this work, can be difficult to simulate. Combinations of these methods as in, are limited by simulator fidelity, and often focused on tasks with specific and easily measurable success criterion. (See e.g., S. James, et al., "Sim-to-real via sim-to-sim: Data-efficient robotic grasping via randomized-to-canonical adaptation networks", in Proceedings of the IEEE Conference on Computer Vision and Pattern Recognition, 2019; and J. Mahler, et al., "Dex-net 2.0: Deep learning to plan robust grasps with synthetic point clouds and analytic grasp metrics", arXiv preprint arXiv:1703.09312, 2017; the disclosures of which are herein incorporated by reference in their entireties.)

Learning from Demonstration and Imitation Learning. Imitation learning (IL) is often preferred over reinforcement learning (RL) to achieve efficiency in policy learning. Specification of reward functions can be non-intuitive for a number of robotic tasks. (See e.g., A. Y. Ng, et al., "Algorithms for inverse reinforcement learning.", in IcmI, 2000, pp. 663-670; the disclosure of which is herein incorporated by reference in its entirety.) Imitation learning can be performed mainly through inverse reinforcement learning (IRL) or behavioral cloning (BC). (See e.g., S. Krishnan, et al., 2019 (cited above); J. Schulman, et al., "Learning from demonstrations through the use of non-rigid registration", in Robotics Research, Springer, 2016, pp. 339-354; S. Ross, 2013 (cited above); P. Abbeel and A. Y. Ng, "Inverse reinforcement learning", in Encyclopedia of machine learning, Springer, 2011, pp. 554-558; and D. Pomerlau 1989 (cited above); the disclosures of which are herein incorporated by reference in their entireties.) However, these algorithms typically either require a large amount of data (BC) or a large number of environment interactions (IRL).

Crowdsourced Teleoperation for Robot Learning. Collecting large amounts of data has been a challenge for continuous manipulation tasks. Crowdsourcing supervision has resulted in some remarkable scaling of datasets in computer vision and natural language. (See e.g., P. Rajpurkar, et al., 2018 (cited above); and J. Deng, et al., 2009 (cited above).) In robotics, crowdsourcing over the internet was first introduced to robotics in the Telegarden Project. (See e.g., K. Goldberg, "Beyond the web: Excavating the real world via mosaic", in Second International WWW Conference, 1994; the disclosure of which is herein incorporated by reference in its entirety.) Since then a number of studies have leveraged the crowd to ask for help. (See e.g., J. Sung, et al., "Robobarista: Object part based transfer of manipulation trajectories from crowd-sourcing in 3d pointclouds", in Robotics Research, Springer, 2018, pp. 701-720; A. Sorokin, et al., "People helping robots helping people: Crowdsourcing for grasping novel objects", in 2010 IEEE/RSJ International Conference on Intelligent Robots and Systems, IEEE, 2010, pp. 2117-2122; and P. F. Hokayem and M. W. Spong, "Bilateral teleoperation: An historical survey", Automatica, vol. 42, no. 12, pp. 2035-2057, 2006; the disclosures of which are herein incorporated by reference in their entireties.) Prior works have also built frameworks for web-based low-latency robot control. (See e.g., R. Toris, et al., "The robot management system: A framework for conducting human-robot interaction studies through crowdsourcing", Journal of Human-Robot Interaction, 2014; the disclosure of which is herein incorporated by reference in its entirety.) Kehoe et al. provides a treatise that touches on the aspects of cloud robotics: big data, cloud computing, collective robot learning and crowdsourcing. (See e.g., B. Kehoe, et al., "A survey of research on cloud robotics and automation", IEEE Transactions on automation science and engineering, vol. 12, no. 2, pp. 398-409, 2015; the disclosure of which is herein incorporated by reference in its entirety.) Teleoperation mechanisms vary from game interfaces to free-space positioning interfaces. (See e.g., J. Kofman, et al., "Teleoperation of a robot manipulator using a vision-based human-robot interface", IEEE transactions on industrial electronics, 2005; and R. Marin, et al., "A multimodal interface to control a robot arm via the web: A case study on remote programming", IEEE Transactions on Industrial Electronics, 2005; the disclosures of which are herein incorporated by reference in their entireties.) A comparison of various control interfaces shows that general purpose hardware is deficient while special purpose hardware is more accurate but is not widely available. (See e.g., R. Marin, et al., 2005 (cited above); and D. Kent, et al., "A comparison of remote robot teleoperation interfaces for general object manipulation", in Proceedings of the 2017 ACM/IEEE International Conference on Human-Robot Interaction, ACM, 2017, pp. 371-379; the disclosures of which are herein incorporated by reference in their entireties.)

Virtual reality-based free-space controllers have recently been proposed both for data collection and policy learning. (See e.g., J. I. Lipton, et al., "Baxter's homunculus: Virtual reality spaces for teleoperation in manufacturing", IEEE Robotics and Automation Letters, vol. 3, no. 1, pp. 179-186, 2018; D. Whitney, et al., "Comparing robot grasping teleoperation across desktop and virtual reality with ros reality", Intl Symp. of Robotics Research, 2017; X. Yan, et al., "Learning grasping interaction with geometry-aware 3d representations", arXiv preprint arXiv:1708.07303, 2017; and T. Zhang, et al., 2017 (cited above); the disclosures of which are herein incorporated by reference in their entireties.) While these methods have shown the utility of data, they do not provide a seamlessly scalable data collection mechanism. Often the data is either collected locally or requires a powerful local client computer, to render the high definition sensor stream to a VR headset. (See e.g., D.

Whitney, et al., 2017 (cited above); and T. Zhang, et al., 2017 (cited above).) The use of VR hardware and requirement of client-side compute resources has limited the deployment of these interfaces on crowdsourcing platforms.

In order to collect data, many embodiments leverage the RoboTurk platform, which allows large groups of remote users to simultaneously collect task demonstrations by using their smartphones as motion controllers to control robots in simulated domains. RoboTurk is a platform that allows users to seamlessly collect task demonstrations in simulation through low-latency teleoperation, regardless of their location or compute resources. Users connect to a website that streams video from the simulated environment, and use their smartphone as a motion controller to control the robot. The simulation itself runs in a remote server hosted in the cloud—this is to ensure homogeneous quality of service to every user regardless of available compute resources. In this way, RoboTurk facilitates crowdsourcing task demonstrations in simulated domains from large pools of remotely located annotators.

In order to support concurrent low-latency teleoperation servers that allow many users to use the platform simultaneously, the platform utilizes several core components. Many embodiments leverage Web Real-Time Communication (WebRTC) to establish low-latency communication links between a user's phone, web browser, and a teleoperation server that is hosted in the cloud. Various embodiments include one or more of:

a. User Endpoint. Certain embodiments allow individual users to control the robotic device using a smartphone as a motion controller and receives a real-time video stream of the robot workspace in their web browser. The phone transmits its changes in position and its current absolute orientation over WebRTC to the teleoperation server. Several embodiments additionally provide users with the ability to enable and disable control of the robot so that users can re-position their arm and phone for better ergonomics similar in nature to interfaces for surgical robots. (See e.g., L. Fritsche, et al., "First-person teleoperation of a humanoid robot", in Humanoid Robots (Humanoids), 2015 IEEE-RAS 15th Intl Conference on, 2015; the disclosure of which is herein incorporated by reference.)

b. Coordination Server. This server creates and manages teleoperation sessions when users enter or leave the system.

c. Teleoperation Server. Certain embodiments include teleoperations servers as a process dedicated to a single user that is created by the centralized coordination server on a per-user basis. The server maintains its own simulator instance, sends frames to the user's web browser, and handles the incoming control commands from the user.

Embodiments herein allow for the collection of real-world, physical domain control of robotic devices. To make the transition to real-world or physical settings, many embodiments approach the following challenges as described:

a. Limited resources. While the number of simulation instances that can be run in parallel is bottlenecked only by compute resources, data collection on physical robots is bottlenecked by the number of available robots. Thus, to extend RoboTurk to the physical robot setting, many embodiments implement a mutual exclusion principle to limit the number of users on the platform. The coordination server loads a centralized landing page for all users and routes them to a robot and corresponding task. It places a lock on the control of each physical robot arm so that only one user may operate the robot at a time.

b. Control latency. Controlling a robot in a simulator is markedly different from controlling a physical robot due to stochastic delays that can occur at a hardware level (e.g., commanding the motors) and at a network level, since commands are sent to the robot through a network connection. These are uncontrollable delays that are incurred in addition to those from the connection between the user and the teleoperation server. To account for these delays, several embodiments use a low-pass filter to reject high-frequency user input to ensure smooth and responsive teleoperation. By focusing on the low-frequency content in a user's command stream, we are able to ensure that delays do not adversely affect a person's capability to control the robot arm. Furthermore, instead of having teleoperation servers run on cloud infrastructure, certain embodiments spawn teleoperation servers on machines that are located in close physical proximity to the robots in order to minimize the latency of control commands send to the robot arms.

c. Robot safety. To address the need for safety of the robot arms and workspaces, a smartphone app in many embodiments is extended to ensure that the user is holding the phone correctly and exercising slow, deliberate motions by validating phone poses. Data collection participants can be given a short (e.g., approximately 5-minute), structured tutorial to familiarize themselves with operation of the physical robot arm, and also given a direct line of communication to people monitoring the robots to ensure quick responses to unsafe user control.

d. Data collection. Data collection in simulation is straightforward, since the state of the simulator can be saved at each timestep. From this minimal simulator state, all ground-truth observations of interest can be reconstructed. In contrast, data collection in the real world is much more unstructured. Multiple sensor streams emit data at different rates. To account for this, a number of embodiments leverage rosbag, a package built on top of the Robot Operating System (ROS), that allows for recording messages sent over concurrent publisher-subscriber communication channels called topics.

Figure 1B:
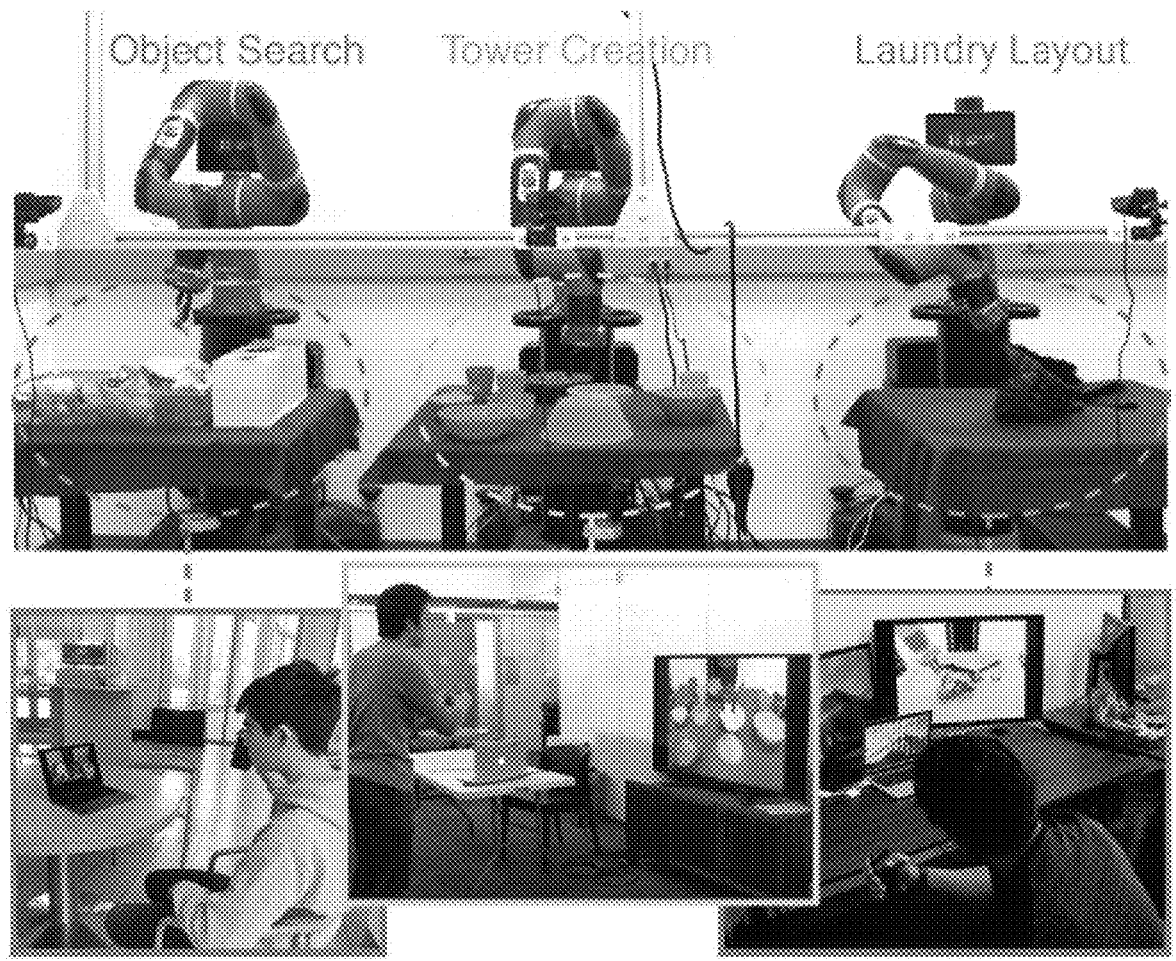
FIG. 1B illustrates robotic devices setups to accomplish specific tasks in accordance with various embodiments of the invention.

Turning to FIGS. 1A-1E, many embodiments address the problem of large-scale crowdsourcing on real robots by collecting task demonstrations on physical robots from humans to scale data collection along two dimensions: the quantity of data collected, and the diversity of data collected. Many embodiments utilize crowdsourced data for machine learning and/or training for independent robotic operation. Many embodiments address the ensuing challenges such as: establishing a framework to remotely manage robots, handling additional delays due to hardware actuation not present in simulators, ensuring operational safety when operated by novice users, and managing alignment of data streams from a multitude of sensors for a number of robots simultaneously. (See e.g., A. Mandlekar, et al., "RoboTurk: A Crowdsourcing Platform for Robotic Skill Learning through Imitation", in Conference on Robot Learning, 2018; the disclosure of which is herein incorporated by reference in its entirety.) Such embodiments implement a method to collect the data and deploy a learned skill, such as demonstrated in the example illustrated in FIG. 1A. As shown in FIG. 1A, many embodiments specify a task (1), which can be any number of tasks achievable by a robot, including locating a specific objects or items, assembling a structure, or performing some other action. Generally, tasks of many embodiments are tasks requiring human intervention both at the level of reasoning and dexterity of manipulation. FIG. 1B illustrates three exemplary tasks, including "object search" where the robot is tasked with identifying a specific item among many items, "tower creation" where a robot is tasked with assembling a tower from various smaller components, and "laundry layout" to spread out a piece of clothing without any wrinkles.

Figure 1C:
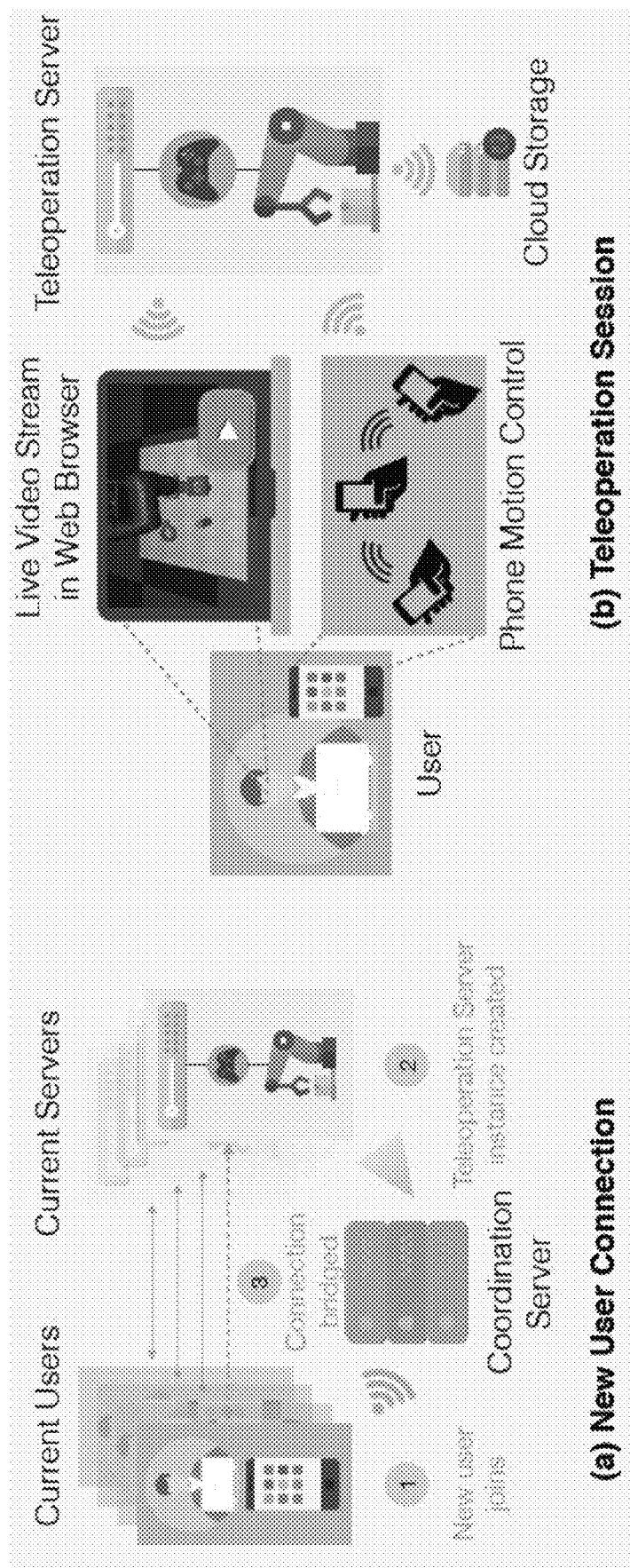
FIG. 1C illustrates remote connection and operation of robotic devices in accordance with various embodiments of the invention.
Figure 1D:
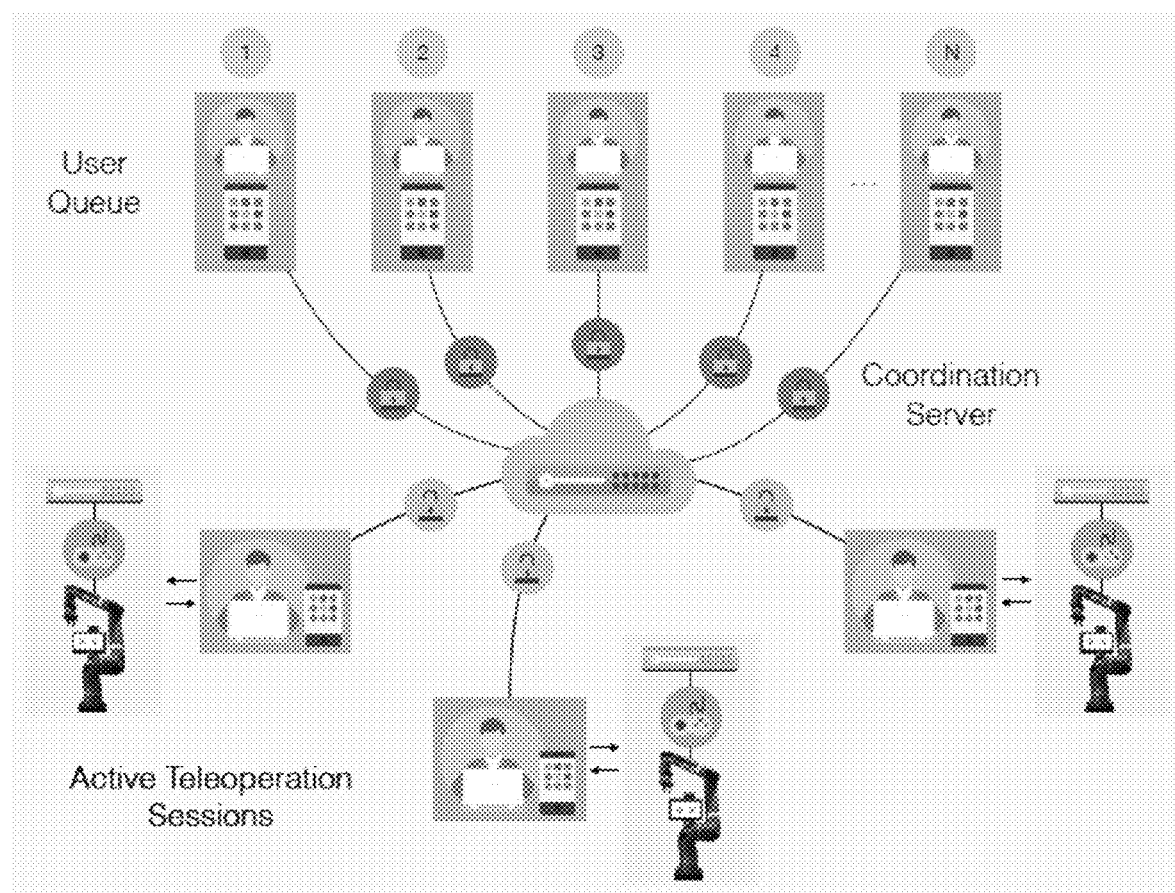
FIG. 1D illustrates a system diagram for teleoperating (remotely operating) robotic devices in accordance with various embodiments of the invention.

Returning to FIG. 1A, these tasks are deployed as tasks to human operators of a robotic arm for large-scale data collection (2). In various embodiments, the data collection is performed via network interfaces, where a human operator is located geographically distant from a robotic arm, while some embodiments obtain data from human operators located proximally close to the robot and or controls the robot via a direct controller (rather than networked). Some embodiments utilize robot simulators, rather than actual robotic arms to collect data. An exemplary data collection systems are illustrated in FIG. 1C, where a human operator, or user, can connect to a coordination server to form a connection bridge between the user and a robot or robot simulator. This bridge allows for a user to control the robot or robot simulator via web browser, mobile app, or other software interface. Controls can include a keyboard, a mouse, a video game controller, a 3D-mouse, a special purpose master-slave interfaces, or a through free-space positioning interfaces such as virtual reality (VR), a joystick, a touchpad, a touch screen, and combinations thereof. Some embodiments allow control via the device itself (e.g., phone), where the sensors and movement of the phone allow for operation of a robot or simulator. Feedback in the form of video feed can be displayed on a person's device (e.g., laptop, phone, tablet, etc.). The data collected from the control of the device can be stored on a local or remote server (e.g., cloud storage). As seen in the exemplary embodiment of FIG. 1D, such configurations allow for certain embodiments to connect a number of users to different robots or simulators to complete various tasks simultaneously.

Returning to FIG. 1A, the completion of certain tasks provides demonstration-guided reinforcement learning for a system to learn a policy (3), where the policy can be deployed as a learned skill (4) for a robot.

Figure 1E:
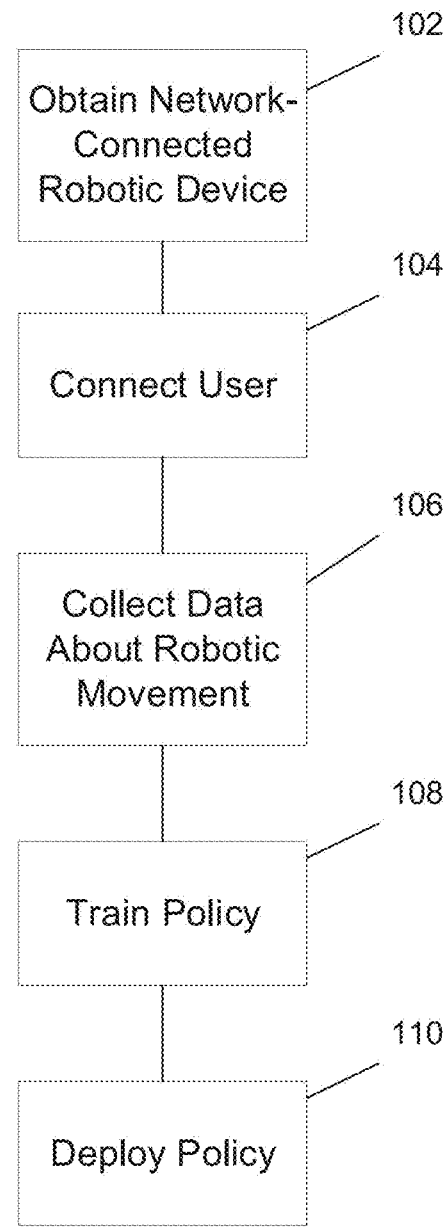
FIG. 1E illustrates method for training and deploying a policy in accordance with various embodiments of the invention.

FIG. 1E illustrates a method 100, in accordance with various embodiments, to train a robotic device for independent operation. Many embodiments obtain a network-connected robotic device at 102. As noted elsewhere, the network connection can be accomplished using a teleoperation server or other computing device that allows control and/or monitoring of the robotic device by a user over a network. Certain embodiments include multiple robotic devices, where individual users can control individual robotic devices.

At 104, many embodiments connect a user to a robotic device at 104. In some embodiments, multiple users are allowed to connect to multiple robotic devices (e.g., 5 users and 5 robotic devices, where each user is connected to an individual robotic device). In certain embodiments, the connection is accomplished using a coordination server as described herein.

At 106, various embodiments collect data about movement of the robotic device under the control of a user. The data collected in many embodiments, is accomplished by specifying a task for the user to complete using the robotic device, and the solution to the task are collected. As the user controls the robotic device in an attempt to complete the task, the movements, controls, and other relevant data of the robotic device is collected. In many embodiments, data is collected from many users.

Various embodiments train a policy based on the collected data at 108. In many embodiments, the training is accomplished by using the solutions identified by users via the collected data. At 110, many embodiments deploy the policies on a robotic device to complete the task independent of human control and/or supervision.

Figure 2A:
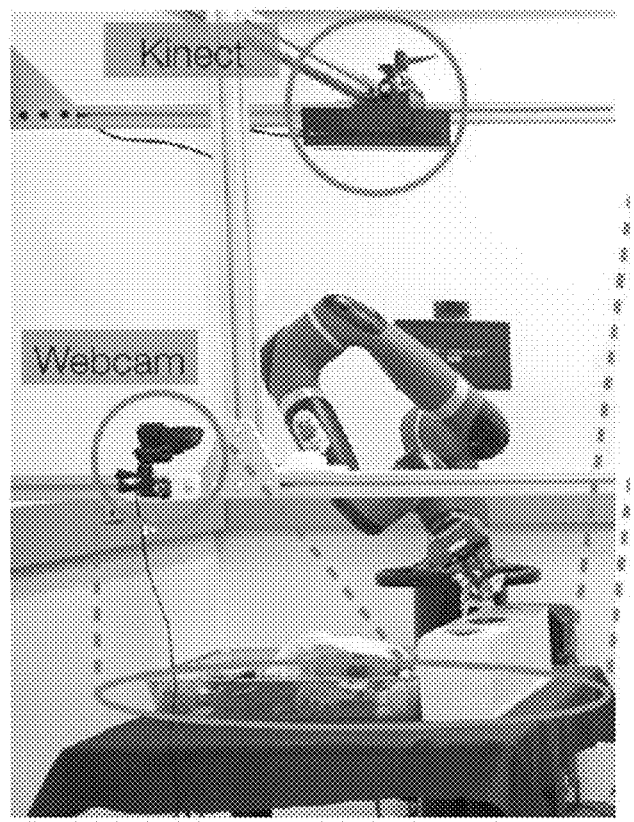
FIG. 2A illustrates a data collection setup in accordance with various embodiments of the invention.
Figure 2B:
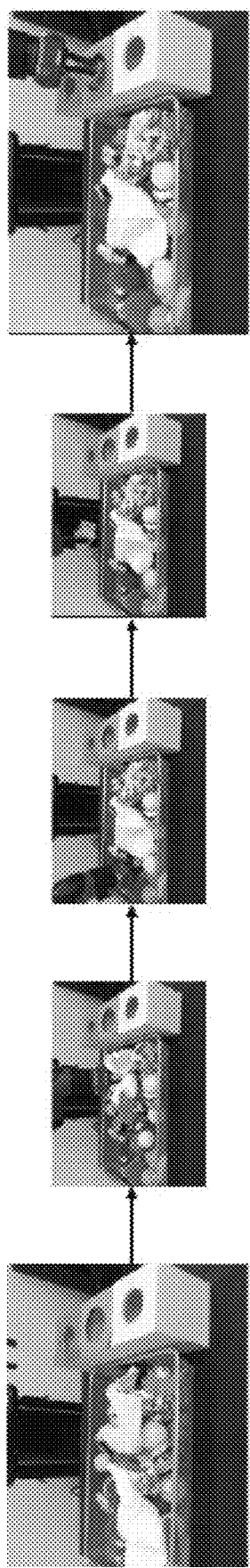
FIGS. 2B-2D illustrate tasks to be accomplished in accordance with various embodiments of the invention.
Figure 2C:
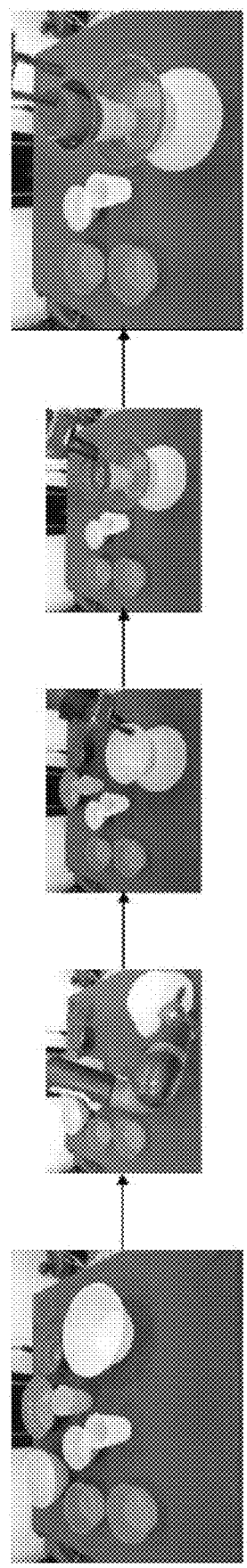
Figure 2D:
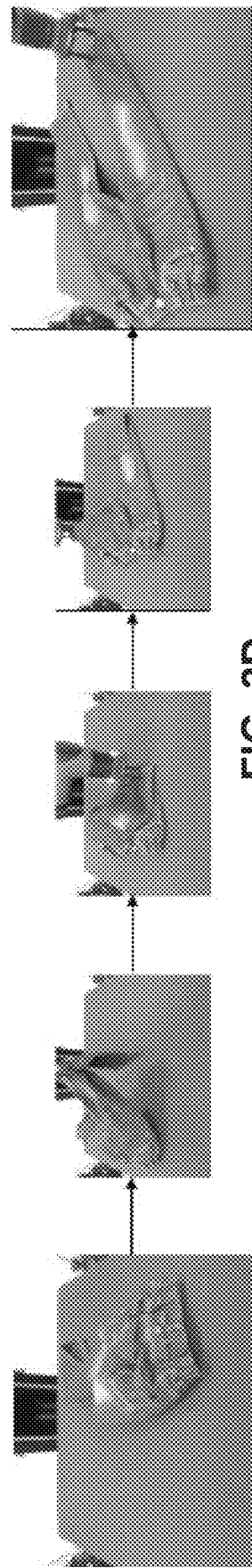
Figure 3A:
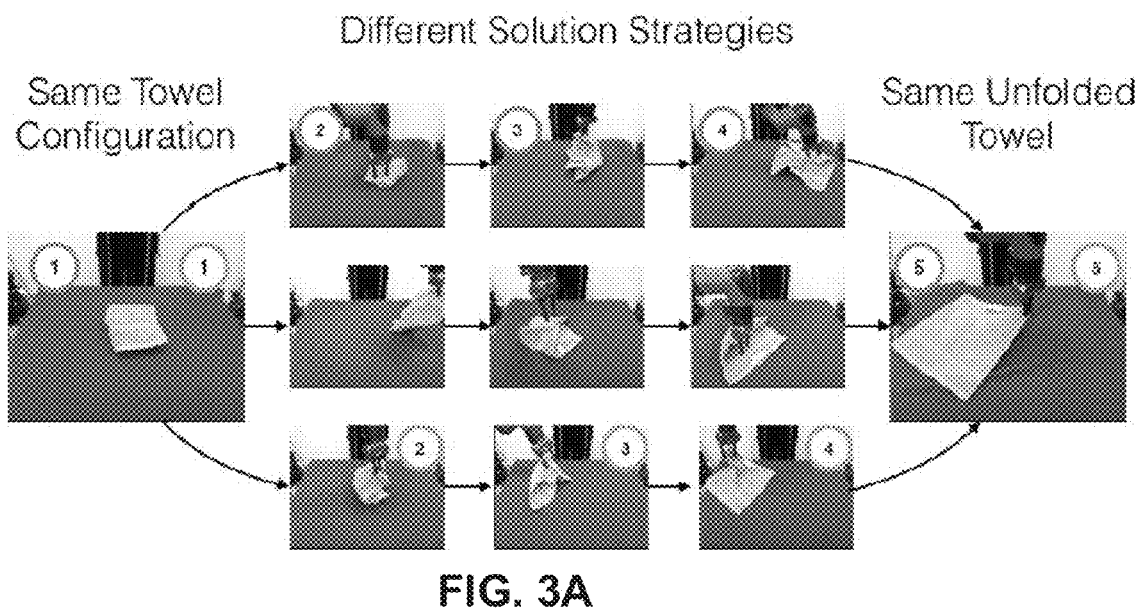
FIGS. 3A-3B illustrates a diversity of solutions for accomplishing tasks using robotic devices in accordance with various embodiments of the invention.
Figure 3B:
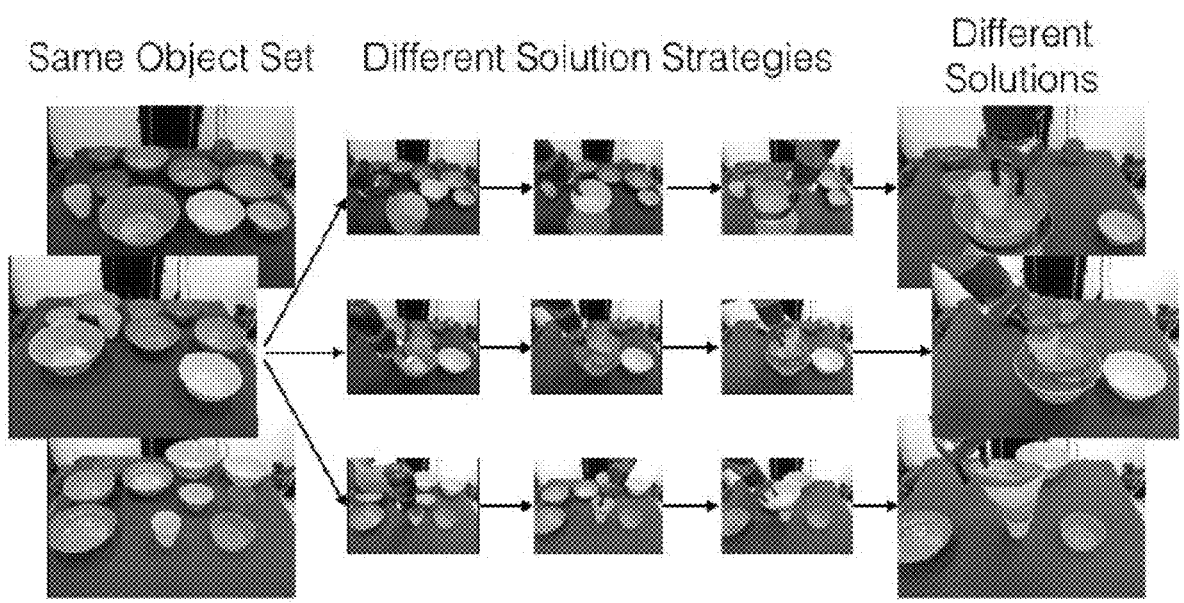

Some embodiments build on RoboTurk, which uses a ubiquitous smartphone-based 6-DoF controller along with seamless cloud integration to ensure homogeneous quality of service regardless of client's compute resources. (See e.g., A. Mandlekar, et al., 2018 (cited above).) In contrast to local teleoperation methods that restrict data collection to a few users, crowdsourcing mechanisms such as RoboTurk can allow several interesting strategies to be demonstrated that vary across people, and across situations, leading to diversity of the data collected, as shown in FIGS. 2A-2D. In particular, FIG. 2A illustrates exemplary data collection setup of various embodiments, which consists of a robot arm, a front-facing webcam view, and a top-down depth camera. In many embodiments, the front-facing view is streamed to each user. Many embodiments collect data on tasks requiring both fine-grained dexterity and high-level planning to solve. FIGS. 2B-2D illustrate three exemplary tasks, including "Object Search" task (FIG. 2B), where the objective is to find all instances of a certain target object category (e.g., plush animal, plastic water bottle, or paper napkin) and fit them into a corresponding bin. In a "Tower Creation" task (FIG. 2C), the objective is to stack the various cups and bowls to create the tallest tower. In the Laundry Layout task (FIG. 2D), the objective is to layout an article of clothing on the table such that it lies flat without folds. Turning to FIGS. 3A-3B, three different demonstrations are provided on the Laundry Layout task (FIG. 3A) and the Tower Creation task (FIG. 3B) are shown. The Laundry Layout demonstrations start and end with the same towel configuration across demonstrations but users exhibited different solution strategies to solve the task. The Tower Creation demonstrations start with the same set of objects in different configurations on the table but users chose to leverage the items in different ways, leading to three towers of roughly the same height, with different structural composition. This showcases the diversity of solution strategies that are present in many embodiments.

EXEMPLARY EMBODIMENTS

Although the following embodiments provide details on certain embodiments of the inventions, it should be understood that these are only exemplary in nature, and are not intended to limit the scope of the invention.

Example 1: Collecting Data from Various Tasks

BACKGROUND: Three robotic manipulation tasks were designed for data collection. These tasks were chosen with care—each task requires the use of low-level dexterity and high-level reasoning in order to solve it—both of which can be provided with a human in the loop. Furthermore, the solution space is multimodal—there are several admissible ways to solve the task for a given task instance. Consequently, there is inherent freedom in our tasks, encouraging a diverse set of users to experiment with different solution strategies.

METHODS: Object Search: The goal of this task is to search for a set of target objects within a cluttered bin and fit them into a specific box. There are three target object categories: plush animals, plastic water bottles, and paper napkins. The workspace consists of a large cluttered bin containing a diverse assortment of objects and three target boxes, one per category of target object. At the start of each task instance, three target objects of each category are mixed in among the clutter of the box. A target category is randomly sampled and relayed to the operator, who must use the robot arm to find all three objects corresponding to the target category and place each item into its corresponding hole. Further constraints were placed on the task, in that objects can be grasped and moved around within the bin but they cannot be placed outside the bin in any sort of staging area, which adds to the challenging nature of the task.

The Object Search task requires human-level reasoning to detect and search for the target items and dexterous manipulation to dig through the bin, push objects out of the way, pick up the target object successfully, and fit the target object into the corresponding hole, making it a good candidate for crowdsourcing. The objects also have interesting properties—the paper napkins appear in crumpled and unfolded configurations, and the crushed plastic water bottles are challenging to detect and grasp due to their translucence and arbitrary rigid shape. Furthermore, it is a practical problem with industrial applications. (See e.g., M. Danielczuk, et al., "Mechanical search: Learning manipulation strategies to extract a specific object from a bin of unknown objects", The 2019 International Conference on Robotics and Automation (ICRA), 2019; the disclosure of which is herein incorporated by reference in its entirety.)

Tower Creation. In this task, an assortment of cups and bowls are arranged on the table. The goal of the task is to create the tallest tower possible by stacking the cups and bowls on top of each other. This task requires physical reasoning over the properties of each type of cup and bowl and thinking about how to stack them on top of each other to maximize height without sacrificing the stability of the tower.

Initial task configurations were diversified by sampling a set of ten objects drawn from a total of 28 bowls in 7 varieties and 12 cups in 3 varieties. Initial configurations of the objects were also randomized, which encourages diversity in the demonstrations since users will not receive the same set of objects in the same configuration, enforcing each demonstration to be unique.

Laundry Layout. This task starts with a hand towel, a pair of jeans, or a t-shirt placed on the table. The goal is to use the robot arm to straighten the item so that it lies flat on the table with no folds. On every task reset the item was randomly placed into a new configuration. This task was chosen for the visual and physical reasoning skills necessary to unfold and flatten the item. Solving it requires understanding the current item configuration and how it will respond to different types of contact.

Data Collection: A dataset was collected using 54 different participants over the course of 1 week. Every user participated in a supervised hour of remote data collection, including a brief 5-minute tutorial at the beginning of the session. Afterwards, they were given the option to collect data without supervision for all subsequent collection. The users who participated in the data collection study collected the data from a variety of locations. All locations were remote, such that no data collection occurred in front of the actual robot arms.

Figure 4A:
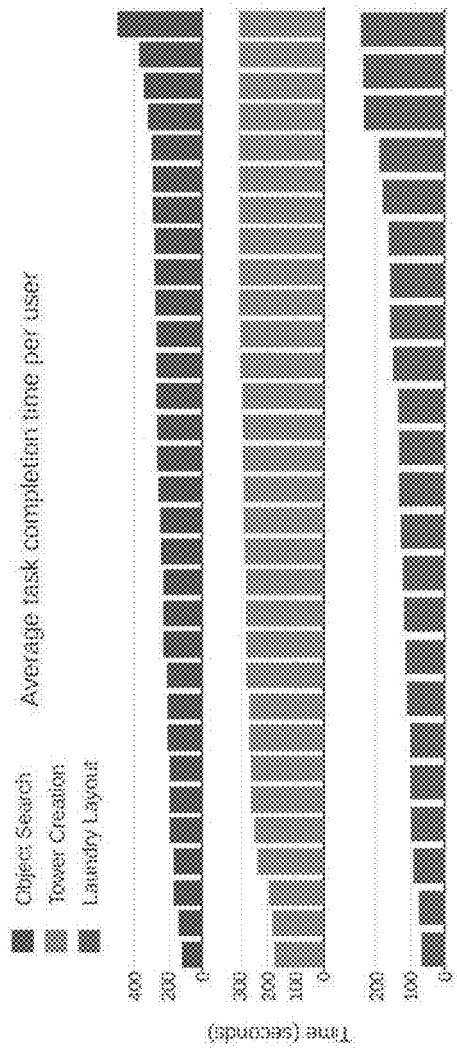
FIG. 4A illustrates a bar graph of user skill comparisons in accordance with various embodiments of the invention.

RESULTS: FIGS. 2A-2D illustrate the data collection setup, using three Sawyer robot arms, each having a front-facing webcam and a top-down Kinect depth camera mounted in the workspace of the robot arm. RGB images were collected from the front-facing RGB camera (which is also the teleoperator video stream view) at 30 Hz, RGB and Depth images from the top-down Kinectv2 sensor also at 30 Hz, and robot sensor readings such as joint and end effector information, at approximately 100 Hz. Table 1 compares the dataset against other robot datasets collected using humans. With over 111 hours of total robot manipulation data in our dataset, the dataset of this embodiment is 1-2 orders of magnitude larger than most other datasets. The number of task demonstrations in our dataset also compares favorably with the number of demonstrations in large datasets such as MIME [34], but the tasks that we collected data on are more difficult to complete, as they take on the order of minutes to complete successfully, as opposed to seconds (see FIG. 4A). (See e.g., P. Sharma, et al., "Multiple interactions made easy (MIME): large scale demonstrations data for imitation", CoRR, vol. abs/1810.07121, 2018. arXiv: 1810.07121; the disclosure of which is herein incorporated by reference in its entirety.) FIG. 4A illustrates average task completion time plotted for all users. The distribution indicates a wide range of skill exhibited across users on the Object Search and Laundry Layout tasks—more skillful users are able to complete these tasks in less time. By contrast, the uniform spread in times across the Tower Creation task indicates that all users were persistent in using all five minutes to create their tower.

CONCLUSION: Embodiments are capable of outsourcing data in a scalable way, such to allow users to remotely operate robotic arms and gather data on completing specific tasks.

Example 2: System Analysis

BACKGROUND: The contributing users had a wide range of skill level, as seen in FIG. 4A, but regardless of individual skill, strong trends of skill improvement with experience were noticed. It was observed that users learned how to use the teleoperation control system very quickly, and once they became comfortable with it, they not only completed tasks faster, but more efficiently. Users demonstrated a higher degree of dexterity as they gained experience performing tasks.

METHODS: Quantitative Performance Analysis: Data was collected in accordance with the methods in Example 1.

Qualitative User Feedback: Motivated by a previous study on robot teleoperation interfaces, we had each participant complete a NASA TLX form upon completion of the study. (See e.g., D. Kent, 2017 (cited above); and S. G. Hart and L. E. Staveland, "Development of nasa-tlx (task load index): Results of empirical and theoretical research", in Advances in psychology, vol. 52, Elsevier, 1988, pp. 139-183; the disclosures of which are herein incorporated by reference in their entireties.) This self-reported survey measured the participants' perception on mental demand, physical demand, temporal demand, performance, effort, and frustration on a 21-point scale.

Figure 4B:
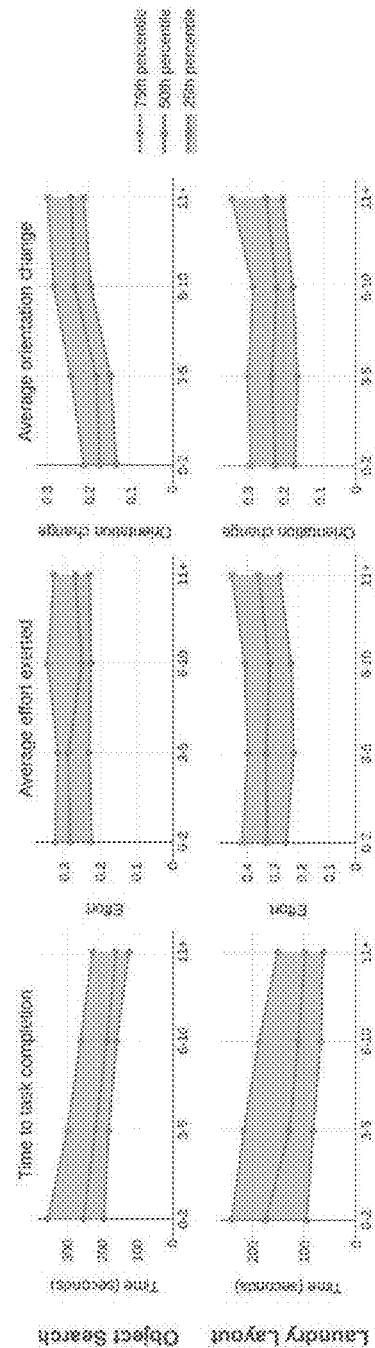
FIG. 4B illustrates improvement in user skill over time in accordance with various embodiments of the invention.

RESULTS: FIG. 4B demonstrates quantitative results that corroborate what the observations from Example 1. Task completion times steadily decreased as users gained experience doing the task. Average user exertion was measured, as estimated by the square $L_2$ norms of phone translations during control, and found it largely invariant with respect to amount of experience, demonstrating that faster completion times were not due to users simply performing the same trajectory faster. By contrast, the average phone orientation change increased with experience, confirming that users learned to control the robot with more dexterous motion, enabling them to complete the task faster.

In particular FIG. 4B shows task completion times across users versus number of demonstration of experience (left), average effort exerted versus experience (middle), and average change in orientation versus experience (right) on Object Search (top) and Laundry Layout (bottom). Together, these show that with experience, users learn to use more nuanced motion to complete tasks faster and more efficiently. Task completion time drops steadily as experience increases. However, average effort exerted (measured by the square $L_2$ norms of phone translations) is largely invariant across experience, while phone orientation change increases with experience, implying that users improve over time not by moving the phone faster, but rather by learning to enact more dexterous motions. Each graph displays quartiles to show that changes are consistent across the entire population. The Tower Creation task was excluded from this evaluation since most users insisted on using all five minutes to create their tower.

For user feedback, the total workload was computed as the sum of these averages, where higher scores represent a higher workload on users. From Table 2, users found that the tower stacking task required the most workload across all the metrics.

CONCLUSION: Task completion speed increased with experience using a phone to control the robotic arm.

Example 3: Data Analytics

BACKGROUND: In this exemplary embodiment, properties of the dataset were investigated that demonstrate the potential utility of the data for several applications such as multimodal density estimation, video prediction, reward function learning, policy learning and hierarchical task planning.

Figure 5:
FIG. 5 illustrates complexity in an Object Search task in accordance with various embodiments of the invention.

One of the key novelties of the dataset presented is the complexity of the reasoning necessary to plan a strategy for solving the tasks and the actual dexterity necessary to perform the finer details of manipulating the objects. This exemplary embodiment focused on the Object Search task since there is a simple qualitative measure to demonstrate the complexity of the task through the start and end configurations of the bin. FIG. 5 shows the start and end configurations of the bin over several successful task demonstrations, and the large difference between start and end frames on the Object Search demonstrates the significant amount of effort required to solve the task. The fact that these configurations vary greatly is evidence that the operator needed to drastically reorient the contents of the bin to find the objects of interest.

METHODS: Data was collected in accordance with Example 1.

Inferring a Reward Signal from Demonstrations: Consider the problem of learning a policy to imitate a specific video demonstration. Prior work has approached this problem by learning an embedding space over visual observations and then crafting a reward function to imitate a reference trajectory based on distances in the embedding space. (See e.g., Y. Aytar, et al., "Playing hard exploration games by watching youtube", in Advances in Neural Information Processing Systems, 2018, pp. 2935-2945; and P. Sermanet, et al., "Time-contrastive networks: Self-supervised learning from video", in 2018 IEEE International Conference on Robotics and Automation (ICRA), IEEE, 2018, pp. 1134-1141; the disclosure of which are herein incorporated by reference in their entireties.) This reward function can then be used with reinforcement learning to learn a policy that imitates the trajectory. Taking inspiration from this approach, a modified version of Time Contrastive Networks (TCN) was trained on Laundry Layout demonstrations and investigate some interesting properties of the embedding space.

To address the large and diverse amount of data that was collected, two important modifications to the TCN algorithm were made. The original algorithm used a triplet loss to encourage neighboring video frames to be close in the embedding space; however, it was found that applying the original TCN algorithm to our dataset resulted in embeddings with distances that were not meaningful for frames with larger time separation in a demonstration. Learning an embedding space that can tolerate frames with large temporal separation is critical for our dataset, since our tasks are multi-stage and our demonstrations are several minutes long.

In order to learn both high and low frequency temporal similarity, each demonstration was split into chunks of uniform size and use two separate triplet losses—an intra-chunk loss that pushes neighboring frames from within the same chunk of time together in the embedding space and an inter-chunk loss that encourages frames from nearby chunks of time to be close in the embedding space. An auxiliary loss was also added to encourage terminal demonstration frames to be close in the embedding space.

Behavioral Cloning: Policies were trained using Behavioral Cloning on the Laundry Layout task by learning a mapping from RGB images to robot joint positions. Attempts to learn from the entire dataset were ultimately unsuccessful due to the diverse nature of the demonstrations, but this exemplary embodiment was able to achieve some success by restricting the training data to demonstration segments where the arm moves to a corner of the towel, and lifts the towel up. Addressing the diversity of the dataset for policy learning is left for future work.

RESULTS: Diversity of Task Demonstrations and Solution Approaches: One of the benefits of collecting data from a set of 54 users on tasks with an unstructured solution space is that every user has a unique approach to solve a given task instance. FIG. 3 presents three demonstrations on the Laundry Layout task that started with similar towel configurations and ended successfully with the towel flat on the table. The demonstration frames show that although the start and end configurations are similar, the approach used to flatten the towel are markedly different. For example, the user that provided the top demonstration chose to pick one side of the towel, place it down in a better configuration, then push the remaining flap of the towel open to complete the task. By contrast, the bottom demonstrator chose to grab a corner of the towel and manipulate it through lifting and dragging motions until the cloth was flat on the table.

FIG. 3 presents three demonstrations on the Tower Creation task that started with the same set of objects, but resulted in three completely different towers. While both towers were comparably high, the users demonstrated different ways to stack the cups and bowls in order to build the tower. The dataset that we collected contains many such instances of multimodality and creative problem solving that stem from the diversity of the humans that generated the data.

Figure 6:
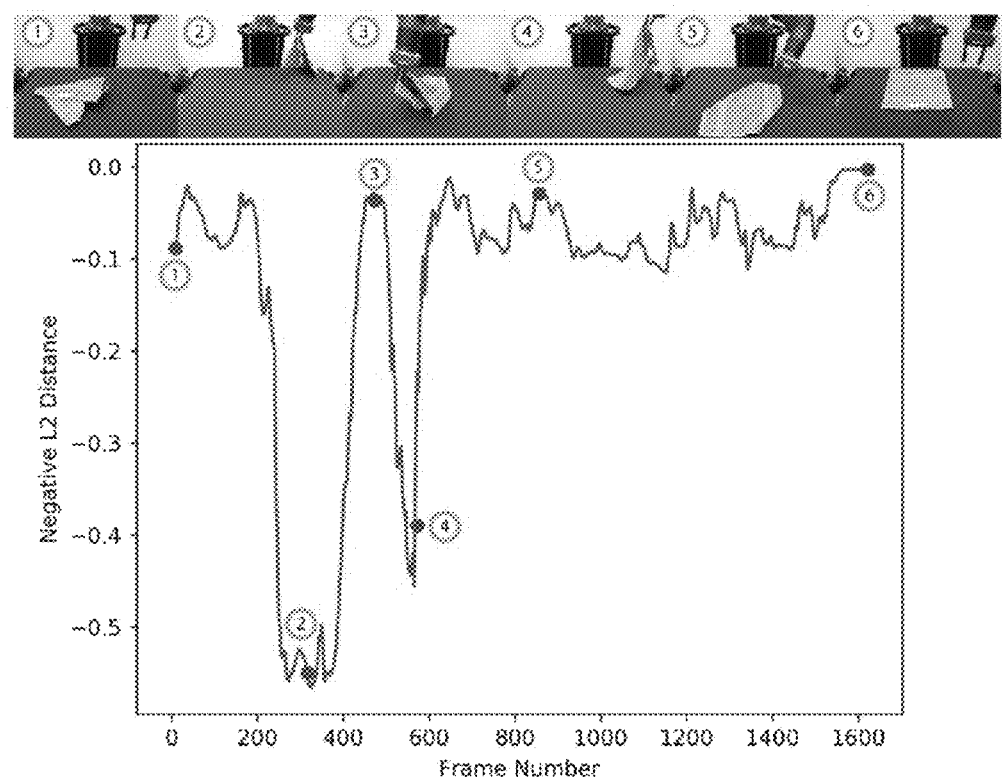
FIG. 6 illustrates training a machine learning algorithm according to a Laundry Layout task in accordance with various embodiments of the invention.

In FIG. 6, frame embeddings were considered along a single Laundry Layout demonstration. The negative $L_2$ distance of the frame embeddings was plotted with respect to the embedding of a target frame near the end of the video, where the target frame depicts a successful task completion with the towel lying flat on the table. FIG. 6 demonstrates that distances in this embedding space with a suitable target frame yield a reasonable reward function that could be used to imitate task demonstrations purely from visual observations. Furthermore, embedding distances capture task semantics to a certain degree and could even be used to measure task progress. For example, in frames 3 and 5, the towel is nearly flat on the table, and the embedding distance to frame 6 is correspondingly small. By contrast, in frames 2 and 4, the robot is holding the towel a significant distance away from the table, and the distance to frame 6 is correspondingly large.

CONCLUSION: The gathered data could be used to train robotic arms to complete the same tasks, automatically. However, using a full data set was unsuccessful in producing a fully automatic system, which could be allayed with a limited dataset, which identifies new algorithmic challenges in making use of this data.

DOCTRINE OF EQUIVALENTS

Although the invention has been described in detail with particular reference to these preferred embodiments, other embodiments can achieve the same results. Variations and modifications of the present invention will be obvious to those skilled in the art and it is intended to cover all such modifications and equivalents. The entire disclosures of all references, applications, patents, and publications cited above, and of the corresponding application(s), are hereby incorporated by reference.

TABLE 1

Dataset Comparison. This dataset is compared to similar robot datasets collected via human supervision in prior work. Items marked with * are estimates that were extrapolated using other reported information, and interfaces marked with † are not real-time

| Name | Interface | Task | Avg. Task Length (sec) | Number of Demos | Total Time (hours) |
|---|---|---|---|---|---|
| JIGSAW | DaVinci | surgery | 60 | 103 | 1.66 |
| Deep Imitation | VR | pick, grasp, align | 5 | 1664 | 2.35 |
| DAML | Human demos | pick, place, push | 5 | 2941 | 4.08 |
| MIME | Kinisthetic | pick, place, push, pour | 6 | 8260 | 13.7 |
| PbD | GUI | pick, place | 207 | 465 | 25.8 |
| Roboturk-Real | iPhone AR | Long horizon object manip | 186 | 2144 | 111.25 |

TABLE 2

Self-reported user evaluation of the system.

| Measure | Object Search | Tower Stacking | Laundry Layout |
|---|---|---|---|
| Mental demand | 12.2 ± 3.7 | 13.2 ± 4.4 | 9.3 ± 5.3 |
| Physical demand | 11.1 ± 4.0 | 11.8 ± 4.7 | 9.6 ± 4.6 |
| Temporal demand | 6.0 ± 4.6 | 12.2 ± 6.2 | 7.9 ± 4.9 |
| Performance | 6.3 ± 4.8 | 12.4 ± 5.1 | 7.1 ± 6.1 |
| Effort | 10.8 ± 4.2 | 14.2 ± 3.9 | 10.3 ± 5.1 |
| Frustration | 7.5 ± 5.0 | 13.1 ± 5.2 | 7.3 ± 5.4 |
| Total Workload | 53.9 ± 11.2 | 76.9 ± 12.2 | 51.5 ± 12.8 |

What is claimed is:

1. A system for remotely operating a robotic device, comprising:
    a plurality of network-connected robotic devices configured to perform a task;
    a coordination server configured to manage a plurality of users by performing the steps of:
        matching each of a first set of the plurality of users to a corresponding network-connected robotic device from the plurality of network-connected robotic devices;
        creating a teleoperation process for each of the first set of the plurality of users, wherein the teleoperation process receives at least one control command from each user and transmits each user's at least one control command to the corresponding network-connected robotic device;
        matching each of a second set of the plurality of users to a corresponding virtual version of the network-connected robotic devices in a simulated domain; and
        creating a teleoperation process for each of the second set of the plurality of users, wherein the teleoperation process receives at least one control command from each user and transmits each user's at least one control command to the corresponding virtual version of the network-connected robotic device; and
    a data collection server configured to collect data of the control commands of the first and second set of the plurality of users from the teleoperation processes.

2. The system of claim 1, wherein the system comprises a plurality of network-connected robotic devices configured to accomplish a task, and the coordination server is configured to connect a user to each of the robotic devices in the plurality of robotic devices.

3. The system of claim 2, wherein the coordination server places a lock on the control of each physical robot arm so that only one user may operate a robotic device at a time.

4. The system of claim 1, wherein the teleoperation server process implements a low-pass filter to reject high-frequency user input from the user.

5. The system of claim 1, further comprising a networked control device to allow the plurality of users to control the robotic device.

6. The system of claim 5, wherein the control device is a smartphone.

7. A method for training robots for independent operation, comprising:
    obtaining a plurality of network-connected robotic devices;

connecting managing a plurality of users seeking to control the network-connected robotic devices, wherein the user has control over the network-connected robotic device managing of users comprises:
- matching each of a first set of the plurality of users to a corresponding network-connected robotic device from the plurality of network-connected robotic devices;
- creating a teleoperation process for each of the first set of the plurality of users, wherein the teleoperation process receives at least one control command from each user and transmits each user's at least one control command to the corresponding network-connected robotic device;
- matching each of a second set of the plurality of users to a corresponding virtual version of the network-connected robotic devices in a simulated domain; and
- creating a teleoperation process for each of the second set of the plurality of users, wherein the teleoperation process receives at least one control command from each user and transmits each user's at least one control command to the corresponding virtual version of the network-connected robotic device;
- training a policy based on data of the control commands of the first and second set of users; and
- deploying the policy on an untrained network-connected robotic device allowing the untrained network-connected robotic device to operate independently of a human operator.

8. The method of claim 7, further comprising collecting data of the control commands of the first and second set of users.

9. The method of claim 8, wherein the collecting of data is accomplished by specifying a task for the user to complete using the network-connected robotic device, and solutions completed by the user are saved as data.

10. The method of claim 9, wherein the task requires fine-grained dexterity and high-level planning.

11. The method of claim 7, wherein the plurality of users is managed using a coordination server.

12. The method of claim 11, wherein the coordination server implements a mutual exclusion principle to limit the number of users on a platform.

13. The method of claim 7, wherein the teleoperation processes include a low-pass filter to reject high-frequency input from the user.

14. The method of claim 7, wherein the plurality of users control the network-connected robotic device via a generalized consumer device.

15. The method of claim 14, wherein the generalized consumer device is a smartphone.

16. The system of claim 1, wherein the coordination server creates the teleoperation process in a server that is geographically near the network-connected robotic device.

17. The system of claim 1, wherein the coordination server connects a user from the first set of the plurality of users to a network-connected robotic device in response to determining a server being geographically near the network-connected robotic device to create the teleoperation process between the network-connected robotic device and the user.

18. The method of claim 11, wherein the coordination server creates the teleoperation process in a server that is geographically near the network-connected robotic device.

19. The method of claim 11, wherein the coordination server connects a user from the first set of the plurality of users to a network-connected robotic device in response to determining a server being geographically near the network-connected robotic device to create the teleoperation process between the network-connected robotic device and the user.

* * * * *